(12) United States Patent
Williams et al.

(10) Patent No.: US 7,300,032 B2
(45) Date of Patent: Nov. 27, 2007

(54) VIBRATION AND NOISE ABATEMENT PAD

(75) Inventors: Robert F. Williams, Edison, NJ (US); Robert J. Williams, Edison, NJ (US)

(73) Assignee: ATIRE Terchnologies, Inc., Hillsborough, NJ (US)

( * ) Notice: Subject to any disclaimer, the term of this patent is extended or adjusted under 35 U.S.C. 154(b) by 277 days.

(21) Appl. No.: 11/043,599

(22) Filed: Jan. 25, 2005

(65) Prior Publication Data
US 2006/0163440 A1    Jul. 27, 2006

(51) Int. Cl.
*F16M 13/00* (2006.01)
(52) U.S. Cl. .................. 248/633; 248/346.01; 428/167
(58) Field of Classification Search ................ 248/560, 248/633, 678, 632, 346.01; 428/167, 169; 181/201, 208; 267/141, 153
See application file for complete search history.

(56) References Cited

U.S. PATENT DOCUMENTS

| | | | | | |
|---|---|---|---|---|---|
| 1,628,090 | A | * | 5/1927 | Weiss | 428/169 |
| 1,948,327 | A | * | 2/1934 | Berwick | 428/138 |
| 2,512,310 | A | * | 6/1950 | Corson | 15/215 |
| 2,534,137 | A | * | 12/1950 | Lewis | 428/169 |
| 2,667,654 | A | * | 2/1954 | Goessele et al. | 15/215 |
| 2,975,089 | A | * | 3/1961 | Hargreaves | 428/168 |
| 3,026,224 | A | * | 3/1962 | Rogers, Jr. | 428/167 |
| 3,436,042 | A | * | 4/1969 | Van Goubergen | 248/636 |
| 3,459,400 | A | * | 8/1969 | Rothermel | 248/636 |
| 3,817,939 | A | | 6/1974 | Allen | |
| 4,002,315 | A | * | 1/1977 | Van Goubergen | 248/633 |
| 4,273,213 | A | * | 6/1981 | Munz | 181/207 |
| 4,493,471 | A | * | 1/1985 | McInnis | 248/580 |
| 4,709,781 | A | * | 12/1987 | Scherzer | 181/290 |
| 5,209,968 | A | | 5/1993 | Sweeney | |
| 5,221,702 | A | | 6/1993 | Richards | |
| 5,268,226 | A | | 12/1993 | Sweeney | |
| 5,367,007 | A | | 11/1994 | Richards | |
| 5,573,220 | A | * | 11/1996 | Whittaker et al. | 248/638 |
| 5,664,394 | A | | 9/1997 | Sweeney | |
| 5,728,458 | A | | 3/1998 | Sweeney | |
| 5,762,312 | A | * | 6/1998 | Whittaker | 248/633 |
| 5,925,296 | A | | 7/1999 | Leese | |
| 5,950,980 | A | | 9/1999 | Folmar | |
| 6,050,539 | A | * | 4/2000 | Millen | 248/678 |
| 6,171,540 | B1 | | 1/2001 | Ibaragi | |
| 6,583,211 | B1 | | 6/2003 | Wayts | |

\* cited by examiner

*Primary Examiner*—Anita M. King
(74) *Attorney, Agent, or Firm*—Sills Cummis & Gross; Barry J. Marenberg

(57) ABSTRACT

A base pad for supporting mechanical machines and equipment and which is configured such that it reduces the noise and vibration emanating from these machines. The pad is constructed entirely from shredded and comminuted rubber tires and is configured such that it provides for the efficient run-off and/or draining of any moisture generated from under the machine unit.

25 Claims, 3 Drawing Sheets

VIBRATION AND NOISE ABATEMENT PAD

FIELD OF THE INVENTION

The present invention relates to a vibration and noise reducing pad. More specifically, the invention relates to a pad for positioning under a machine, such as for example, an air conditioner unit, a furnace, a heater, a refrigerator or washing and drying machines, and which supports the machine and absorbs the vibration and noise that emanate from the machine.

BACKGROUND

Heating, ventilation and air conditioning equipment are generally large machines with numerous mechanical parts on the inside such as compressors, condensers, heaters, evaporators, fans and motors to name just a few. The functioning of the parts inside these machines is generally loud and causes a significant amount of vibration. In many of these machines, vibration from a compressor, fan or motor often causes soldered joints to break and oftentimes to leak refrigerant of other fluids (some which may be caustic) which can lead to rapid degradation of components inside the unit. The breakage and degradation of these internal components often require costly unnecessary repairs and may also lead to possible damage to the ozone layer. Additionally, the operation of these machines is generally very noisy.

Oftentimes, these large machines are placed directly on a surface such as the floor in a home or on the grass outside a house. Other times, these machines are elevated off the floor surface and sit on a block or slab of material such as concrete, foam, fiberglass, plastic or wood. The slab keeps the machine off the floor so as to avoid coming in contact with water in the event there is a flood, and oftentimes to provide some degree of cushioning.

SUMMARY OF THE INVENTION

The invention provides a base pad for supporting mechanical machines and is configured such that it reduces the noise and vibration emanating from these machines. Additionally, the configuration of the pad in accordance with the present invention provides for the efficient run-off and/or draining of any moisture generated from under the machine unit.

In addition to saving the machine unit from damage caused by floor water, the inventive pad plays a vital role in extending the life of the unit since it reduces the vibration of the unit caused by its internal components. Furthermore, the inventive pad reduces the noise generated by the machine unit thus rendering the machine more amenable to various interior locations inside a home or office.

In accordance with the present invention, the inventive pad is composed entirely from rubber shredded from used tires. Rubber from used tires provides a very cost-effective and environmentally friendly material from which the inventive pads are constructed. It is known that the disposal of scrap or used tires poses a serious threat to our environment. Unlike other waste products, tires do not readily break down in air or soil. It has been estimated that three billion tires have been discarded into U.S. dumps and land fills. Often, whole tires are simply piled onto vacant space within the dump, creating an eyesore. There, the inner cavities of these tires collect rain water and provide a breeding ground for mosquitoes. As a further hazard, the discarded tires in these piles are often worn to the point where their reinforcing wires are exposed. The exposed wire can injure persons handling the tires or children that attempt to climb the piles. In other instances, the tires are buried. Chemical reactions between the tires, soil, and air trapped in the cavity can create sufficient heat to ignite the tires, creating a dangerous fire hazard. For these reasons, there have been many attempts to recycle tires into useful products.

The pad in accordance with the present invention is molded and formed from 100% comminuted rubber tires. The overwhelming majority of the tires used in preparing these pads will come from waste dumps and recycle centers. As such, the use of these tires in the manufacture of the inventive pad in accordance with the present invention provides an extremely valuable use for a very undesirable waste product and as such eliminates a troublesome disposal problem and environmental nuisance.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE FIGURES

These and other features, aspects, and advantages of the apparatus and methods of the present invention will become better understood with regard to the following description, appended claims, and accompanying drawings where:

DETAILED DESCRIPTION

Figure 1:
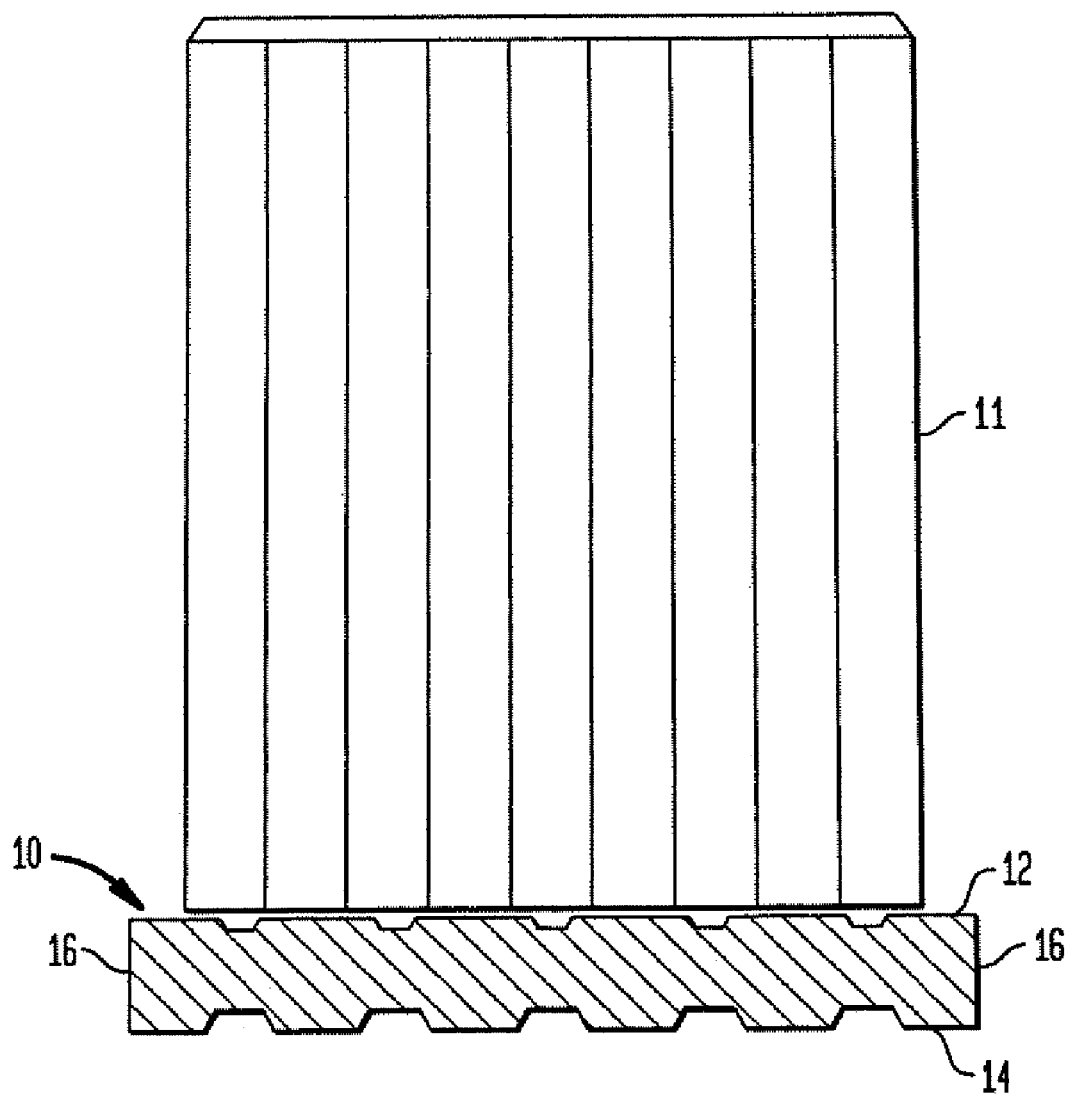
FIG. 1 is a side elevation view of one embodiment of the pad in accordance with the present invention and having a machine unit.
Figure 2:
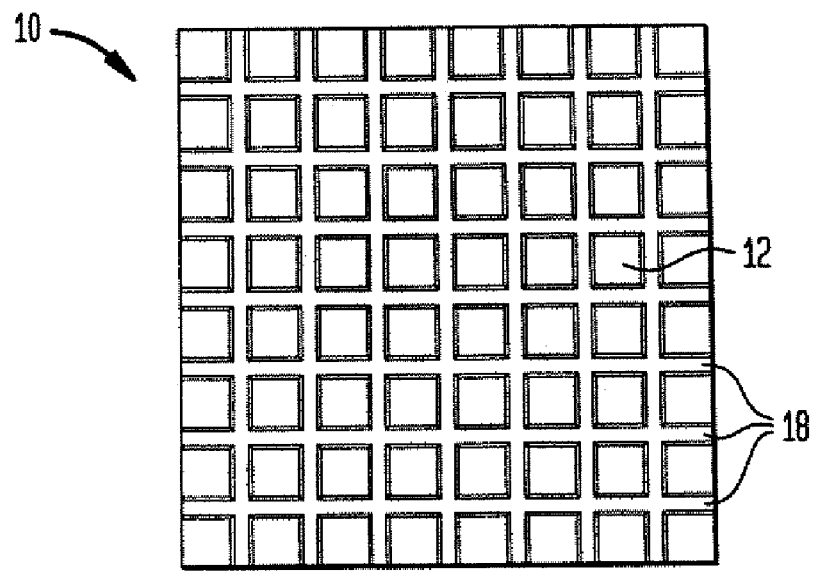
FIG. 2 is a top plan view of the pad in accordance with the present invention.
Figure 3:
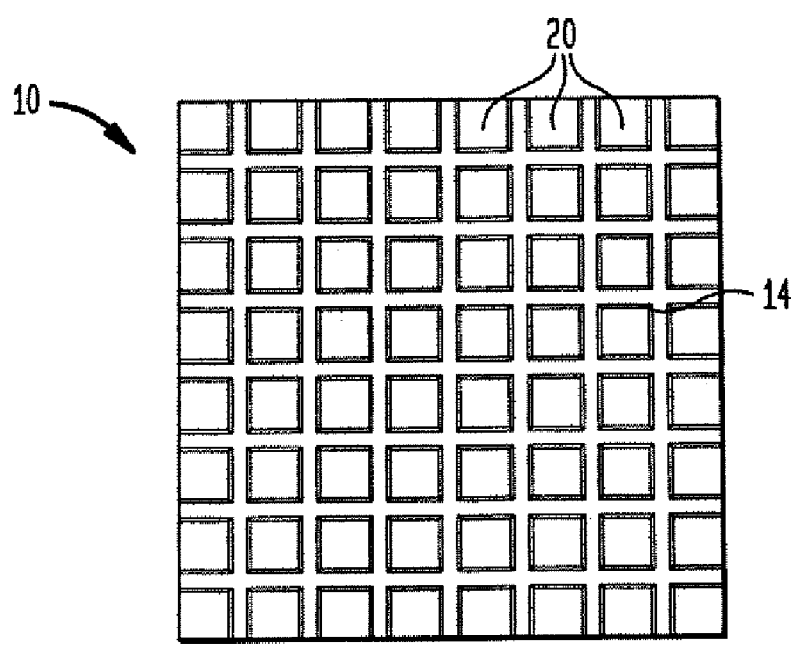
FIG. 3 is a bottom plan view of the pad in accordance with the present invention.
Figure 4:
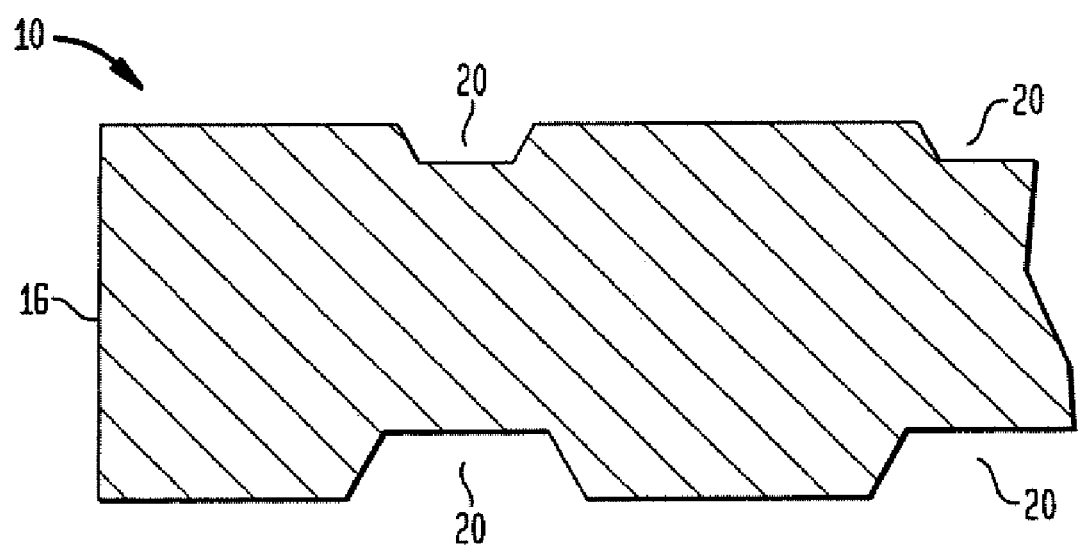
FIG. 4 is a side elevation view of one embodiment of the pad in accordance with the present invention.

A monolithic pad 10 in accordance with one embodiment of the present invention is illustrated in FIGS. 1-3. Pad 10 has a top surface or upper side 12 and a lower surface or underside 14. A plurality of side surfaces 16 surround pad 10. FIG. 1 illustrates one embodiment of pad 10 with a machine unit 11 positioned on pad 10. In the embodiment illustrated in FIGS. 2 and 3, upper side 12 is provided having a "waffle-like" configuration. This "waffle-like" configuration is one comprising a plurality of channels 18 and indentations or pockets 20. Channels 18 on upper side 12 and underside 14 of pad 10 run parallel and perpendicular to each other and criss-cross or intersect one another on both upper side 12 and underside 14 of pad 10. Within the intersecting channels the indentations or pockets 20 are formed. Pockets 20 on underside 14 of pad 10 are generally configured to be deeper than pockets 20 on upper side 12 of pad 10; however the invention is not limited to this configuration. In one embodiment pockets 20 on underside 14 of pad 10 are twice the depth of pockets 20 on upper side 12. Pockets 20 on underside 14 are generally deeper so as to absorb the vibration and noise emanating from the machine unit positioned on pad 10. Additionally, as illustrated in FIG. 4, pockets 20 on underside 14 of pad 10 having a greater depth than pockets 20 on upper side 12 permit ground or surface water to easily flow through pad 10 and not flood or overflow around pad 10, thus preventing contact with the machine unit on pad 10. The monolithic configuration of pad 10 allows pad 10 to absorb vibrations and noise and disperse them throughout pad 10. Channels 18 on upper side 12 and shallow pockets 20 on upper side 12 facilitate the draining of moisture that may collect thereon from the bottom of the machine unit.

In FIGS. 2 and 3, pockets 20 are illustrated as square shaped in configuration. The invention is not, however, limited in this respect, and cups 20 can be formed to any shape such as circular, rectangular, triangular, pentagonal, hexagonal and octagonal, etc. Additionally, channels 18 are not limited to straight channels as illustrated in FIGS. 2 and 3. For example, channels 18 may be zigzag or wavy lines.

Pad 10 may be provided in a wide range of sizes depending upon the size and weight of the machine to be placed upon it. It is anticipated that pad 10 be provided in sizes ranging from approximately 1 ft×1 ft to approximately 6 ft×6 ft though the invention is not limited with respect to the size of the pad.

In use, pad 10 can be placed on a surface in new constructions, beneath a new unit, used to replace the block, slab or support pad of an existing unit, or placed on top of an existing pad. Pad 10 may have a variety of different thicknesses which can depend upon that size and weight of machine it is supporting, as well as the degree of vibration and/or noise to be abated. Pad 10 is generally lightweight for easy handling. Without being limited to a specific thickness, it is intended that pad 10 may have a thickness in the range of from approximately ½ inch to approximately 6 inches in order to provide a stable, level platform. Side surfaces 16 may be substantially vertical or may be slanted outward. When side surfaces 16 slant outward, underside 14 has a surface area greater than that of upper side 12.

Pad 10 is comprised of shredded or comminuted rubber from tires. The shredded rubber from tires which may be obtained from waste dumps and recycling facilities (i.e. scrap tires), is heat-pressed into various sizes. A mold or cast (not shown) is generally used to provide the channels 18 and cups 20 on upper side 12 and underside 14 of pad. The shredded rubber may then be heated and then poured, injected and/or pressed into the mold. In one embodiment, the mold will include ribs and nubs on the internal surfaces to form channels 18 and pockets 20 on pad 10. Upon cooling, the mold is removed to provide a pad 10 having a desired size based on the mold used, and having channels 18 and pockets 20 as described hereinabove. Pad 10 made from 100% comminuted rubber tires will not crack, break or rot.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A noise and vibration abatement pad comprising:
   a. a top surface and a lower surface having sidewalls positioned between the top surface and bottom surface;
   b. a plurality of channels formed on the top surface and the bottom surface;
   c. a plurality of pockets on the top surface and the bottom surface, the pockets formed between the channels, wherein the plurality of pockets on the bottom surface of the pad have a depth twice that of the plurality of pockets on the top surface of the pad.

2. The pad as recited in claim 1, wherein the, plurality of channels on the top surface and the bottom surface of the pad run parallel and perpendicular to each other.

3. The pad as recited in claim 1, wherein the plurality of channels intersect one another on the top surface and the bottom surface of the pad.

4. The pad as recited in claim 3, wherein the plurality of pockets are positioned within the intersections of the channels.

5. The pad as recited in claim 1, wherein the channels extend across the entirety of the top surface and the bottom surface.

6. The pad as recited in claim 5, wherein the channels are straight.

7. The pad as recited in claim 5, wherein the channels are wavy.

8. The pad as recited in claim 1, wherein the pockets on the top surface and the bottom surface are a shape selected from a group consisting of a square, rectangle, circle, pentagon, hexagon and octagon, and combinations thereof.

9. The pad as recited in claim 1, wherein the size of the pad ranges from approximately 1 ft.times.1 ft to approximately 6 ft.times.6 ft.

10. The pad as recited in claim 1, wherein the thickness of the pad ranges from approximately ½ inch to approximately 6 inches.

11. The pad as recited in claim 1, wherein the sidewalls may be slanted outward from the top surface to the bottom surface of the pad.

12. The pad as recited in claim 1, formed from shredded tires.

13. The pad in accordance with claim 12, wherein the shredded tires are heat pressed to form the pad.

14. The pad as recited in claim 1, wherein the pockets on the bottom surface of the pad are effective in absorbing noise and vibration.

15. The pad as recited in claim 1, wherein the channels on the top surface of the pad facilitate the runoff of moisture and water that collect on the pad.

16. The pad as recited in claim 1, wherein the pad is positioned on a surface.

17. The pad as recited in claim 1, wherein the pad is configured to support a machine unit thereon.

18. The pad as recited in claim 1, wherein a machine unit is positioned on the pad.

19. The pad as recited in claim 18, wherein the machine unit is selected from the group consisting of: air conditioning units, heaters, furnaces, compressors, refrigerators washing and drying machines, motors, fans, computers or stereo speakers.

20. A noise and vibration abatement pad comprising:
   a. an top surface and a lower surface having sidewalls positioned between the top surface and bottom surface;
   b. a plurality of channels formed on the top surface and the bottom surface;
   c. a plurality of pockets on the top surface and the bottom surface, the pockets formed between the channels, wherein the plurality of pockets on the bottom surface of the pad have a depth twice that of the plurality of pockets on the top surface of the pad; and wherein the pad is composed entirely from rubber shredded from used tires.

21. The pad as recited in claim 20, wherein the plurality of channels on the top surface and the bottom surface of the pad run parallel and perpendicular to each other.

22. The pad as recited in claim 20, wherein the plurality of channels intersect one another on the top surface and the bottom surface of the pad.

23. The pad as recited in claim 22, wherein the plurality of pockets are positioned within the intersections of the channels.

24. The pad as recited in claim 20, wherein the channels extend across the entirety of the top surface and the bottom surface.

25. The pad as recited in claim 20, wherein the pockets on the top surface and the bottom surface are a shape selected from a group consisting of a square, rectangle, circle, pentagon, hexagon and octagon, and combinations thereof.

* * * * *